United States Patent
Xiong et al.

(10) Patent No.: US 12,292,220 B2
(45) Date of Patent: May 6, 2025

(54) MULTI-PARALLEL CARBON DIOXIDE HEAT PUMP CONTROL METHOD BASED ON TARGET LOAD CONTROL

(71) Applicant: JIANGSU SUJING GROUP CO., LTD., Jiangsu (CN)

(72) Inventors: Dan Xiong, Jiangsu (CN); Xiaoliang Tang, Jiangsu (CN); Hao Pan, Jiangsu (CN); Qiang Kang, Jiangsu (CN); Xiaofei Song, Jiangsu (CN); Jun You, Jiangsu (CN)

(73) Assignee: Jiangsu Sujing Group Co., Ltd., Jiangsu (CN)

( * ) Notice: Subject to any disclaimer, the term of this patent is extended or adjusted under 35 U.S.C. 154(b) by 531 days.

(21) Appl. No.: 17/664,203

(22) Filed: May 19, 2022

(65) Prior Publication Data

US 2022/0282892 A1 Sep. 8, 2022

Related U.S. Application Data

(63) Continuation of application No. PCT/CN2019/122571, filed on Dec. 3, 2019.

(30) Foreign Application Priority Data

Nov. 28, 2019 (CN) .......................... 201911186969.1

(51) Int. Cl.
*F25B 9/00* (2006.01)
*F25B 30/02* (2006.01)
*F25B 49/02* (2006.01)

(52) U.S. Cl.
CPC .............. *F25B 9/008* (2013.01); *F25B 30/02* (2013.01); *F25B 49/022* (2013.01);
(Continued)

(58) Field of Classification Search
CPC ........ F25B 9/008; F25B 30/02; F25B 49/022; F25B 2309/061; F25B 2600/02;
(Continued)

(56) References Cited

U.S. PATENT DOCUMENTS

| | | | | |
|---|---|---|---|---|
| 6,467,289 B2 * | 10/2002 | Kuroki | ................. | F24H 15/215 62/201 |
| 2005/0268625 A1 * | 12/2005 | Sienel | ..................... | F25B 9/008 62/129 |
| 2017/0010051 A1 * | 1/2017 | Connolly | ................ | F25B 30/02 |

FOREIGN PATENT DOCUMENTS

| | | | |
|---|---|---|---|
| CN | 103926098 A | | 7/2014 |
| CN | 103940148 A | * | 7/2014 |

(Continued)

OTHER PUBLICATIONS

International Search Report and Written Opinion issued for International Patent Application No. PCT/CN2019/122571, dated May 14, 2020 in 13 pages including English translation.

*Primary Examiner* — Miguel A Diaz
*Assistant Examiner* — Ibrahim A. Michael Adeniji
(74) *Attorney, Agent, or Firm* — Knobbe Martens Olson & Bear LLP

(57) ABSTRACT

A multi-parallel carbon dioxide heat pump control method based on target load control, wherein the multi-parallel carbon dioxide heat pump comprises a carbon dioxide circulation loop, a heat source pipeline and a hot water pipeline, and the control method comprises: adjusting the opening degree of an electronic expansion valve (3) according to the temperature of an inlet of the hot water pipeline, the temperature of an outlet of the hot water pipeline, the flow in the hot water pipeline and a target outlet temperature set by a user, such that the steady-state change of system pressure can be realized by adjusting the electronic expansion valve (3) on the basis of the fluctuation of parameters (Continued)

such as user side temperature and flow, thus a target outlet temperature change curve is rapidly and stably converged to a target value, and the outlet temperature can be rapidly stabilized.

10 Claims, 2 Drawing Sheets

(52) U.S. Cl.
CPC ..... *F25B 2309/061* (2013.01); *F25B 2600/02* (2013.01); *F25B 2600/2513* (2013.01)

(58) Field of Classification Search
CPC .......... F25B 2600/2513; F25B 2309/06; F25B 43/02; F25B 2339/047; F25B 2500/19; F25B 25/005; F25B 49/02; F25B 2400/075; F25B 2700/1931; F25B 2700/21152; F24H 15/219; F24H 15/375; F24H 15/38

See application file for complete search history.

(56) References Cited

FOREIGN PATENT DOCUMENTS

| CN | 204027841 U | | 12/2014 | |
|---|---|---|---|---|
| CN | 103900281 B | * | 4/2016 | .............. F25B 30/02 |
| CN | 106705467 A | * | 5/2017 | ................ F25B 1/00 |
| CN | 105823282 B | * | 4/2018 | |
| CN | 108195097 A | * | 6/2018 | |

* cited by examiner

MULTI-PARALLEL CARBON DIOXIDE HEAT PUMP CONTROL METHOD BASED ON TARGET LOAD CONTROL

CROSS-REFERENCE TO RELATED APPLICATIONS

This is a continuation of International Application No. PCT/CN2019/122571, filed on Dec. 3, 2019, the entire disclosure of which is hereby incorporated by reference, which claims priority to Chinese Patent Application No. 201911186969.1 filed on Nov. 28, 2019.

FIELD OF TECHNOLOGY

The present disclosure relates to a heat pump control method, in particular to a multi-parallel carbon dioxide heat pump control method based on target load control therefor.

BACKGROUND

As energy conservation and environmental protection equipment that replaces traditional energy supply methods, the heat pump technology has become a hot spot of current research. At present, the normal temperature heat pump technology with a condensing temperature below 50° C. has matured and entered the market application stage, and in order to meet industrial demands and expand the application scope of heat pumps in industry, the heat pump technology is developing in the direction of high temperature, high efficiency, greening and wide heating range. The promotion and use of heat pumps with large heating energy, environment-amity, renewable utilization and excellent circulation performance is one of the key points and difficulties in expanding the application scope of heat pump technology.

The environmentally friendly, efficient and energy-efficient carbon dioxide heat pump system develops from a single-cycle single system to a multi-parallel system, expands from conventional household and light commercial type to large-scale industrial and commercial energy equipment, with megawatt-level cooling and heating output, and a comprehensive energy efficiency of the system is not less than 8.0, which is not only conducive to energy saving and improving the atmospheric environment, but also can drive the adjustment of the industrial institutions, replace some environmentally friendly and inefficient heating methods, such as kerosene gas boilers, and drive the development of the national economy.

The operating pressure of the carbon dioxide heat pump system is 4 to 5 times higher than that of the conventional refrigerant heat pumps, and the addition and removal of the system load can easily cause pressure fluctuations, which leads to system instability, fluctuations of the outlet temperature, and waste of energy. Therefore, the current multi-parallel carbon dioxide heat pump system usually has the problem of low energy utilization rate caused by the defect of the control method. Therefore, a multi-parallel carbon dioxide heat pump control method with high energy efficiency is desired at present.

SUMMARY

The present disclosure is aimed at providing a energy-efficient and efficient multi-parallel carbon dioxide heat pump control method.

To achieve the above purpose, the technical solution employed by the present disclosure is: a multi-parallel carbon dioxide heat pump control method based on target load control, wherein the multi-parallel carbon dioxide heat pump comprises a carbon dioxide circulation loop, a heat source pipeline and a hot water pipeline, the carbon dioxide circulation loop comprises an evaporator evaporating pipe, a gas-liquid separator, a compressor unit, an oil-gas separator, a cooler condensing pipe and an electronic expansion valve which are arranged in series in the loop sequentially, the evaporator evaporating pipe and the heat source pipeline are arranged together to exchange heat with each other, the hot water pipeline and the cooler condensing pipe are arranged together to exchange heat with each other, the compressor unit comprises a plurality of variable-frequency carbon dioxide compressors arranged in parallel, a water pump and a flow meter are provided in the hot water pipeline, and an inlet end and an outlet end of the hot water pipeline are respectively provided with a temperature sensor, and the control method is: adjusting the opening degree of an electronic expansion valve according to the temperature of an inlet of the hot water pipeline, the temperature of an outlet of the hot water pipeline, the flow in the hot water pipeline and a target outlet temperature set by a user, Preferably, the control method comprises the steps of:

1) obtaining the inlet temperature $T_{hi}$ of the hot water pipeline, the outlet temperature $T_{ho}$ of the hot water pipeline and the flow V in the hot water pipeline, and according to a target outlet temperature $T_{obj}$ set by a user, calculating a target heating capacity $Q=1.163*(T_{obj}-T_{hi})*V$, and calculating a current heating capacity $Q_c=1.163*(T_{obj}-T_{ho})*V$;

2) when each carbon dioxide compressor is set to run at 50 Hz, the load of the carbon dioxide heat pump system is 100%, the total number of the carbon dioxide compressors included in the multi-parallel carbon dioxide heat pump is N, and according to the rated working conditions, the rated heating capacity of each carbon dioxide compressor is $Q_s$, then a target load $L=Q/(N*Q_s)*100\%$, and an actual load $L_r=Q_c/(N*Q_s)*100\%$;

3) according to the target load L, the actual load $L_r$, the number n of variable-frequency carbon dioxide compressors, the upper limit $F_{max}$ and the lower limit $F_{min}$ of variable frequency of the variable-frequency carbon dioxide compressors, calculating a target opening degree of the electronic expansion valve:

$$K_e = f(L, L_r, F_{max}, F_{min}, n) = \\ A*\frac{|L_r-L|}{L} + B*\frac{(F_{min}-50)}{F_{max}-F_{min}} + C*\frac{n*(F_{max}-F_{min})}{50N},$$

wherein, A, B and C are respectively specific coefficients, and N is the total number of the carbon dioxide compressors included in the multi-parallel carbon dioxide heat pump;

4) adjusting the opening degree of the electronic expansion valve according to the target opening degree $K_e$ of the electronic expansion valve.

Preferably, if the target load L≥the actual load $L_r$ and the target opening degree $K_e$ of the electronic expansion valve≥the current opening degree $K_c$, adjusting the opening degree of the electronic expansion valve to the target opening degree $K_e$;

if the target load L<the actual load $L_r$ and the target opening degree $K_e$ of the electronic expansion valve≥the current opening degree $K_c$, keeping the current opening degree $K_c$ of the electronic expansion valve unchanged;

if the target load L≥the actual load $L_r$ and the target opening degree $K_e$ of the electronic expansion valve<the current opening degree $K_c$, keeping the current opening degree $K_c$ of the electronic expansion valve unchanged;

if the target load L<the actual load $L_r$, and the target opening degree $K_e$ of the electronic expansion valve<the current opening degree $K_c$, adjusting the opening degree of the electronic expansion valve to the target opening degree $K_e$.

Further, after adjusting the opening degree of the electronic expansion valve, according to the target load L and the actual load $L_r$, calculating the absolute value of the load difference $L_{ab}=|L-L_r|$, and calculating the number $N_c=\text{INT}(L_{ab}/100\%/N)$ of the carbon dioxide compressors that need to be turned on or off; if the target load L≥the actual load $L_r$, gradually turning on $N_c$ carbon dioxide compressors, and if the target load L<the actual load $L_r$, gradually turning off $N_c$ carbon dioxide compressors.

Further, when the $N_c$ carbon dioxide compressors need to be gradually turned on, the time interval for turning on each carbon dioxide compressor is 20 s; each time one carbon dioxide compressor is turned on, it starts from the one with the shortest cumulative running time among the non-operating carbon dioxide compressors;

when the $N_c$ carbon dioxide compressors need to be gradually turned off, the time interval for turning off each carbon dioxide compressor is 5 s; each time one carbon dioxide compressor is turned off, it starts from the one with the longest cumulative running time among the operating carbon dioxide compressors.

Further, after turning on or off the $N_c$ carbon dioxide compressors, recalculating the actual load $L_r$, and the absolute value of the difference $L_{ab}=|L-L_r|$ between the actual load and the target load:

if $L_{ab}≥100\%/N$, recalculating the number $N_c$ of the carbon dioxide compressors that need to be turned on or off, and turning on or off the carbon dioxide compressors;

if $L_{ab}<100\%/N$ and L<$L_r$, adjusting the one with the longest running time among the variable-frequency carbon dioxide compressors in operation to reduce its working frequency, where its working frequency can be as low as $F_{min}$ until L=$L_r$;

if $L_{ab}<100\%/N$ and L≥$L_r$, adjusting the one with the shortest running time among the variable-frequency carbon dioxide compressors in operation to increase its working frequency, where its working frequency can be as high as $F_{max}$ until L=$L_r$.

Further, the inlet and the outlet of each of the carbon dioxide compressors are respectively provided with a temperature sensor.

Further, a pressure sensor is arranged between the gas-liquid separator and the compressor unit.

Further, the oil-gas separator has a gas-liquid inlet connected to the outlets of the carbon dioxide compressors, a gas outlet connected to the inlets of the carbon dioxide compressors, and a liquid outlet connected to the cooler condensing pipe.

Further, a temperature sensor and a pressure sensor are arranged between the compressor unit and the gas-liquid inlet of the oil-gas separator.

Due to the use of the above technical solutions, the present disclosure has the following advantages over the traditional art:

due to that the present disclosure can realize the steady-state change of system pressure by adjusting the electronic expansion valve on the basis of the fluctuation of parameters such as temperature and flow at the user side, so as to realize a stable adjustment of system energy, to realize a rapid and stable convergence of the target water temperature change curve to a target value, and to ensure to rapidly stabilize the outlet temperature.

BRIEF DESCRIPTION

In the figures, 1—gas-liquid separator; 2—oil-gas separator; 3—electronic expansion valve; 4—carbon dioxide evaporator; 5—gas cooler; 6—carbon dioxide compressor; 7—water pump; 8—flow meter.

DETAILED DESCRIPTION

In the following, the present disclosure is further described combining with specific embodiments shown in the accompanying drawings.

Figure 1:
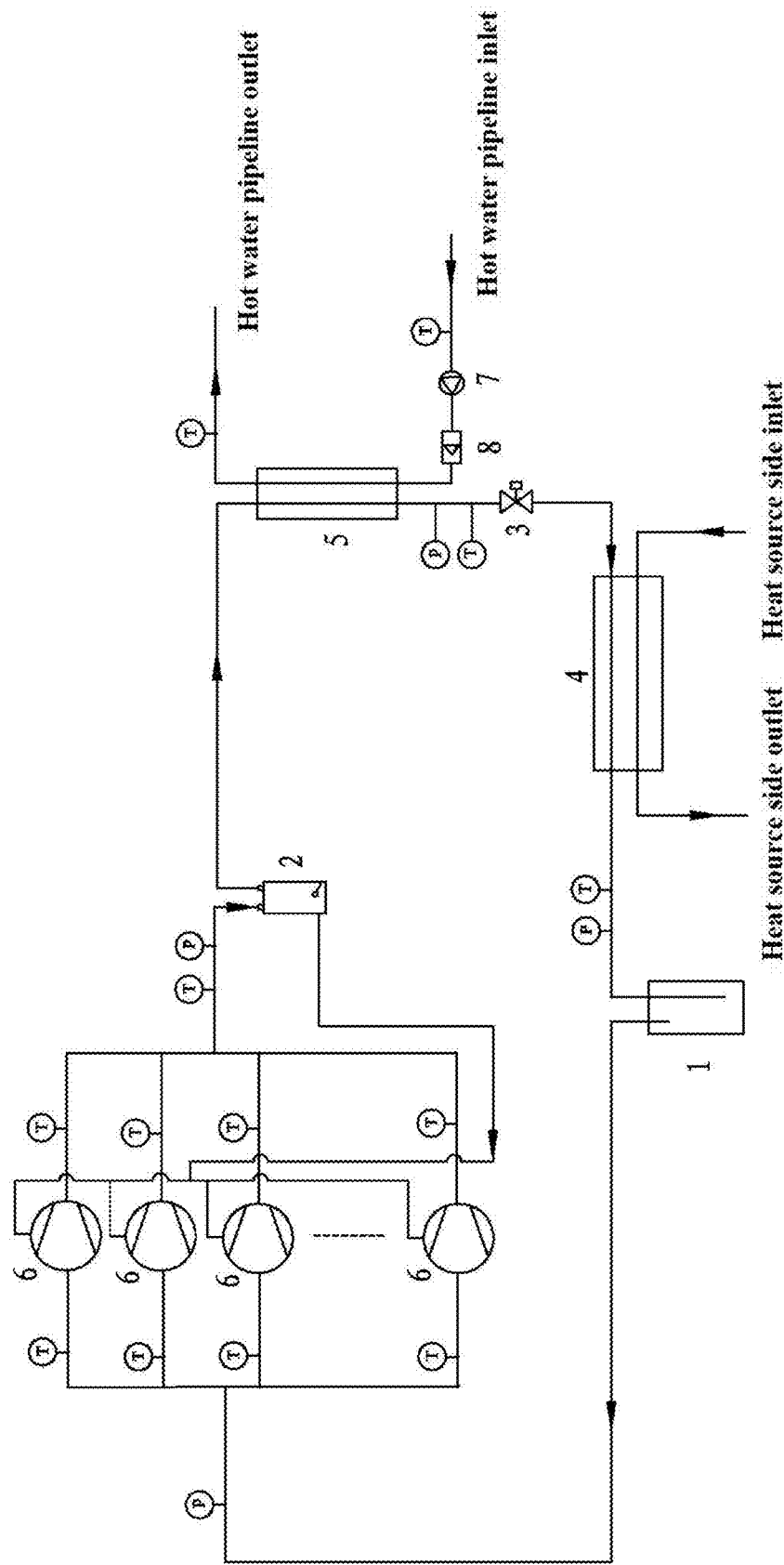
FIG. 1 is a principal diagram of a heat pump system of the present disclosure.

Referring to FIG. 1, a multi-parallel carbon dioxide heat pump comprises a carbon dioxide circulation loop, a heat source pipeline and a hot water pipeline.

The dioxide circulation loop comprises an evaporator evaporating pipe, a gas-liquid separator 1, a compressor unit, an oil-gas separator 2, a cooler condensing pipe and an electronic expansion valve 3 which are arranged in series in the loop sequentially. The evaporator evaporating pipe and the heat source pipeline are arranged together to exchange heat with each other to form a carbon dioxide evaporator 4, and the hot water pipeline and the cooler condensing pipe are arranged together to exchange heat with each other to form a gas cooler 5. The oil-gas separator 2 is provided with a gas-liquid inlet connected to the outlets of carbon dioxide compressors 6, a gas outlet connected to the inlets of the carbon dioxide compressors 6, and a liquid outlet connected to the cooler condensing pipe.

In this embodiment, the compressor unit comprises N carbon dioxide compressors 6 arranged in parallel, wherein the N carbon dioxide compressors 6 comprises n variable-frequency carbon dioxide compressors 6 arranged in parallel (only 4 compressors are shown in the figure), wherein n≤N, and in other embodiment, the appropriate number of carbon dioxide compressors 6 may be selected as required.

In this embodiment, the hot water pipeline is provided with a water pump 7 and a flow meter 8, the flow meter 8 is used to obtain the flow V in the hot water pipeline, and an inlet end and an outlet end of the hot water pipeline are respectively provided with a temperature sensor to obtain the temperature $T_{hi}$ at the inlet of the hot water pipeline and the temperature $T_{ho}$ at the outlet of the hot water pipeline. The inlet and the outlet of each of the carbon dioxide compressors 6 are respectively provided with a temperature sensor to respectively obtain the temperature at the inlet of each of the carbon dioxide compressors 6 and the temperature at the outlet of each of the carbon dioxide compressors 6. A pressure sensor is provided between the gas-liquid separator 1 and the compressor unit to obtain the pressure between the gas-liquid separator 1 and the compressor unit. A temperature sensor and a pressure sensor are provided between the compressor unit and the gas-liquid inlet of the oil-gas separator 2 to obtain the temperature between the compressor unit and the gas-liquid inlet of the oil-gas separator 2.

Figure 2:
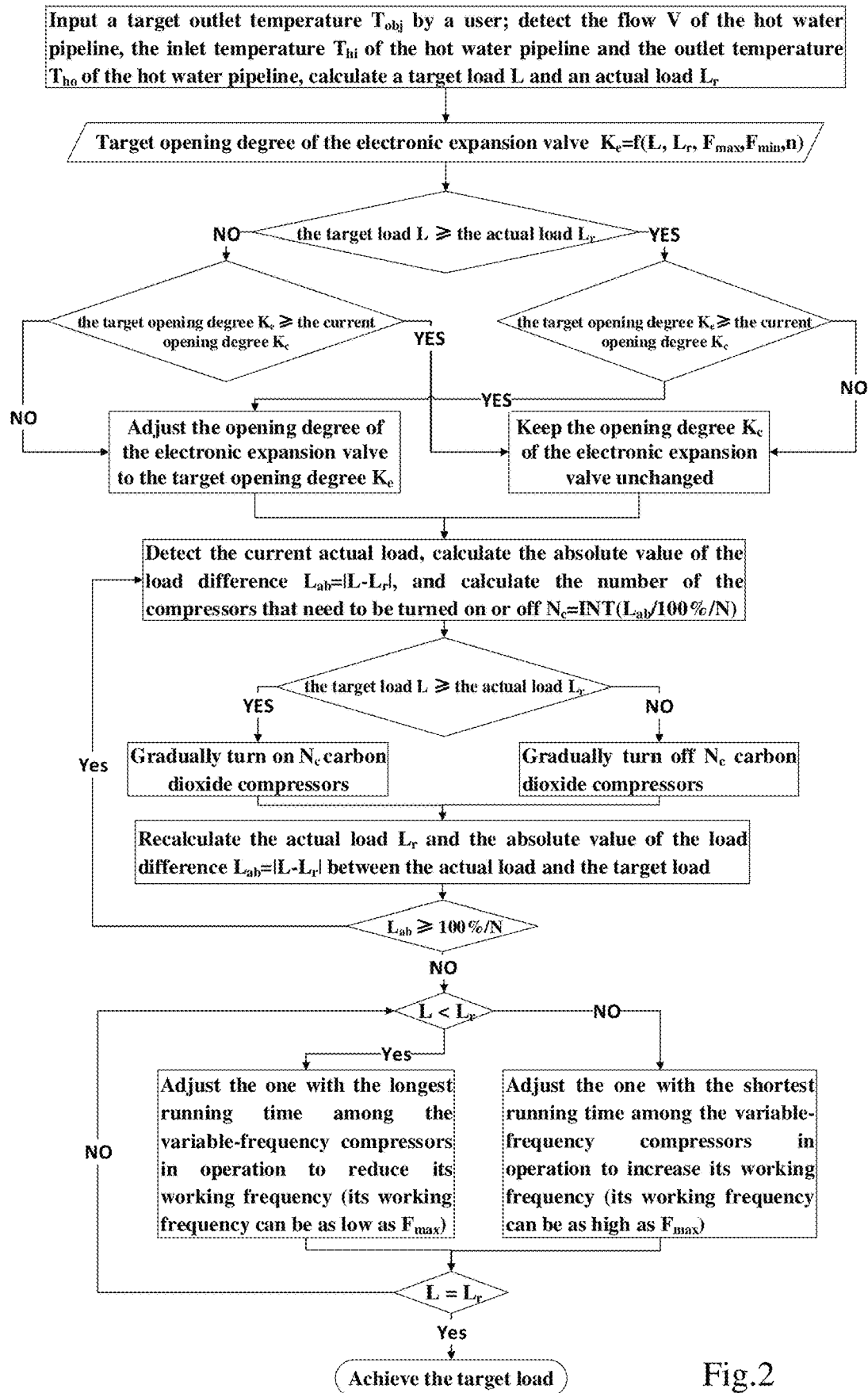
FIG. 2 is a schematic control flow chart of a heat pump system of the present disclosure.

Referring to FIG. 2, a method of controlling the multi-parallel carbon dioxide heat pump described above comprises following steps:

1) obtaining the inlet temperature $T_{hi}$ of the hot water pipeline, the outlet temperature $T_{ho}$ of the hot water pipeline and the flow V in the hot water pipeline, and according to a target outlet temperature $T_{obj}$ set by a user, calculating a target heating capacity $Q=1.163*(T_{obj}-T_{hi})*V$, and calculating a current heating capacity $Q_c=1.163*(T_{obj}-T_{ho})*V$;

2) when each carbon dioxide compressor 6 is set to run at 50 Hz, the load of the carbon dioxide heat pump system is 100%, in this embodiment, the number of the carbon dioxide compressors 6 provided in the multi-parallel carbon dioxide heat pump is N, wherein the N carbon dioxide compressors 6 comprises n variable-frequency carbon dioxide compressors 6, and according to the rated working conditions, the rated heating capacity of each carbon dioxide compressor 6 is $Q_s$, thus a target load $L=Q/(N*Q_s)*100\%$, and an actual load $L_r=Q_c/(N*Q_s)*100\%$;

3) according to the target load L, the actual load $L_r$, the number n of variable-frequency carbon dioxide compressors 6, the upper limit $F_{max}$ and the lower limit $F_{min}$ of variable frequency of the variable-frequency carbon dioxide compressors 6, calculating a target opening degree of the electronic expansion valve 3:

$$K_e = f(L, L_r, F_{max}, F_{min}, n) = A * \frac{|L_r - L|}{L} + B * \frac{(F_{min} - 50)}{F_{max} - F_{min}} + C * \frac{n*(F_{max} - F_{min})}{50N},$$

the formula $f(L, L_r, F_{max}, F_{min}, n)$ is obtained by experimental data fitting, wherein, A, B and C are respectively specific coefficients, and A, B and C obtained by different equipments are different, and N is the total number of the carbon dioxide compressors included in the multi-parallel carbon dioxide heat pump, and $N \geqslant n$.

4) adjusting the opening degree of the electronic expansion valve 3 according to the target opening degree $K_e$ of the electronic expansion valve 3.

In this embodiment, $A=\frac{1}{4}$, $B=\frac{1}{2}$, and $C=\frac{1}{2}$,

Assuming $F_{max}=70$, $F_{min}=30$, $n=4$, $L_r=60\%$, and $L=80\%$, $K_e$ can be calculated as 51.3%, and then according to the calculated value, adjusting the opening degree of the electronic expansion valve 3 to 51.3%.

In the above step 4), the specific adjusting way is: if the target load L≥the actual load $L_r$ and the target opening degree $K_e$ of the electronic expansion valve 3≥the current opening degree $K_c$, adjusting the opening degree of the electronic expansion valve 3 to the target opening degree $K_e$;

if the target load L<the actual load $L_r$ and the target opening degree $K_e$ of the electronic expansion valve 3≥the current opening degree $K_c$, keeping the current opening degree $K_c$ of the electronic expansion valve 3 unchanged;

if the target load L≥the actual load $L_r$ and the target opening degree $K_e$ of the electronic expansion valve 3<the current opening degree $K_c$, keeping the current opening degree $K_c$ of the electronic expansion valve 3 unchanged;

if the target load L<the actual load $L_r$ and the target opening degree $K_e$ of the electronic expansion valve 3<the current opening degree $K_c$, adjusting the opening degree of the electronic expansion valve 3 to the target opening degree $K_e$.

Due to that this embodiment can realize the steady-state change of system pressure by adjusting the electronic expansion valve 3 on the basis of the fluctuation of parameters such as temperature and flow at the user side, so as to realize a stable adjustment of system energy, to realize a rapid and stable convergence of the target outlet temperature change curve to a target value, and to ensure to rapidly stabilize the outlet temperature.

In this embodiment, after adjusting the opening degree of the electronic expansion valve 3, according to the target load L and the actual load $L_r$, calculate the absolute value of the load difference $L_{ab}=|L-L_r|$, and calculate the number of the carbon dioxide compressors 6 that need to be turned on or off $N_c=INT(L_{ab}/100\%/N)$; if the target load L≥the actual load $L_r$, gradually turn on NI, carbon dioxide compressors 6, and if the target load L<the actual load $L_r$, gradually turn off $N_c$, carbon dioxide compressors 6. Compared with reducing the frequency, turning off unnecessary compressors can further save energy, thereby improving the working efficiency of the unit.

The specific method of controlling the carbon dioxide compressors 6 is: when the $N_c$ carbon dioxide compressors 6 need to be gradually turned on, the time interval for turning on each carbon dioxide compressor 6 is 20 s; each time one carbon dioxide compressor 6 is turned on, and it starts from the one with the shortest cumulative running time among the non-operating carbon dioxide compressors 6;

when the $N_c$ carbon dioxide compressors 6 need to be gradually turned off, the time interval for turning off each carbon dioxide compressor 6 is 5 s; each time one carbon dioxide compressor 6 is turned off, and it starts from the one with the longest cumulative running time among the operating carbon dioxide compressors 6. Setting the interval time can prevent the carbon dioxide compressors 6 from being started or shut down frequently, and can extend the service life of the carbon dioxide compressors 6 to a greater extent.

In order to further improve the working efficiency, after turning on or off the $N_c$ carbon dioxide compressors 6, recalculate the actual load $L_r$, and the absolute value of the load difference $L_{ab}=|L-L_r|$ between the actual load and the target load:

if $L_{ab} \geq 100\%/N$, recalculate the number $N_c$ of the carbon dioxide compressors 6 that need to be turned on or off, and turn on or off the carbon dioxide compressors 6;

if $L_{ab}<100\%/N$ and $L<L_r$, adjust the one with the longest running time among the variable-frequency carbon dioxide compressors 6 in operation to reduce its working frequency, where its working frequency can be as low as $F_{min}$ until $L=L_r$;

if $L_{ab}<100\%/N$ and $L \geq L_r$, adjust the one with the shortest running time among the variable-frequency carbon dioxide compressors 6 in operation to increase its working frequency, where its working frequency can be as high as $F_{max}$ until $L=L_r$.

Based on the target load control, this embodiment adjusts the system energy in real time, calculates the deviation between the current load and the target load, and quickly reduces the deviation by loading and unloading of the carbon dioxide compressors 6; when the system deviation is less than the variable-frequency adjustable range, variable-frequency adjustment is performed, after coarse adjustment, fine adjustment is performed to meet the current energy compensation, and finally achieves the target load, to ensure the efficient, safe and stable operation of the unit.

The embodiments described above are only for illustrating the technical concepts and features of the present disclosure, and are intended to make those skilled in the art being able to understand the present disclosure and thereby implement it, and should not be concluded to limit the protective scope of the present disclosure. Any equivalent variations or modifications according to the spirit of the present disclosure should be covered by the protective scope of the present disclosure.

What is claimed is:

1. A multi-parallel carbon dioxide heat pump control method based on target load control, wherein the multi-parallel carbon dioxide heat pump comprises a carbon dioxide circulation loop, a heat source pipeline and a hot water pipeline, wherein the carbon dioxide circulation loop comprises an evaporator evaporating pipe, a gas-liquid separator, a compressor unit, an oil-gas separator, a cooler condensing pipe and an electronic expansion valve which are arranged in series in the loop sequentially; the evaporator evaporating pipe and the heat source pipeline are arranged together to exchange heat with each other; the hot water pipeline and the cooler condensing pipe are arranged together to exchange heat with each other; the compressor unit comprises a plurality of variable-frequency carbon dioxide compressors arranged in parallel; the hot water pipeline is provided with a water pump and a flow meter, and an inlet end and an outlet end of the hot water pipeline are respectively provided with a temperature sensor, wherein the control method comprises adjusting an opening degree of the electronic expansion valve according to an inlet temperature of the hot water pipeline, an outlet temperature of the hot water pipeline, a flow in the hot water pipeline and a target outlet temperature set by a user;

wherein the control method comprises following steps:
1) obtaining the inlet temperature $T_{hi}$ of the hot water pipeline, the outlet temperature $T_{ho}$ of the hot water pipeline and the flow V of the hot water pipeline, and according to the target outlet temperature $T_{obj}$ set by a user, calculating a target heating capacity $Q=1.163*(T_{obj}-T_{hi})*V$, and calculating a current heating capacity $Q_c=1.163*(T_{obj}-T_{ho})*V$;
2) when each carbon dioxide compressor is set to run at 50 Hz, the load of the carbon dioxide heat pump system is 100%, the number of the carbon dioxide compressors provided in the multi-parallel carbon dioxide heat pump is N, and according to the rated working conditions, the rated heating capacity of each carbon dioxide compressor is $Q_s$, thus a target load $L=Q/(N*Q_s)*100\%$, and an actual load $L_r=Q_c/(N*Q_s)*100\%$;
3) according to the target load L, the actual load $L_r$, the number n of variable-frequency carbon dioxide compressors, an upper limit $F_{max}$ and a lower limit $F_{min}$ of variable frequency of the variable-frequency carbon dioxide compressors, calculating a target opening degree of the electronic expansion valve $$K_e = f(L, L_r, F_{max}, F_{min}, n);$$

$$f(L, L_r, F_{max}, F_{min}, n) = A*\frac{|L_r-L|}{L} + B*\frac{(F_{min}-50)}{F_{max}-F_{min}} + C*\frac{n*(F_{max}-F_{min})}{50N},$$

wherein, A, B and C are respectively specific coefficients, and A, B and C obtained by different equipments are different, and N is total number of the carbon dioxide compressors included in the multi-parallel carbon dioxide heat pump;
4) adjusting the opening degree of the electronic expansion valve according to the target opening degree $K_e$ of the electronic expansion valve.

2. The multi-parallel carbon dioxide heat pump control method based on target load control according to claim 1, comprising:
if the target load L≥the actual load $L_r$ and the target opening degree $K_e$ of the electronic expansion valve≥a current opening degree $K_c$, adjusting the opening degree of the electronic expansion valve to the target opening degree $K_e$;
if the target load L<the actual load $L_r$ and the target opening degree $K_e$ of the electronic expansion valve≥a current opening degree $K_c$, keeping the current opening degree $K_c$ of the electronic expansion valve unchanged;
if the target load L≥the actual load $L_r$ and the target opening degree $K_e$ of the electronic expansion valve<a current opening degree $K_c$, keeping the current opening degree $K_c$ of the electronic expansion valve unchanged;
if the target load L<the actual load $L_r$ and the target opening degree $K_e$ of the electronic expansion valve<the current opening degree $K_c$, adjusting the opening degree of the electronic expansion valve to the target opening degree $K_e$.

3. The multi-parallel carbon dioxide heat pump control method based on target load control according to claim 2, comprising: after adjusting the opening degree of the electronic expansion valve, according to the target load L and the actual load $L_r$, calculating the absolute value of the load difference $L_{ab}=|L-L_r|$, and calculating the number of the carbon dioxide compressors that need to be turned on or off $N_c=INT(L_{ab}/100\%/N)$; if the target load L≥the actual load $L_r$, gradually turning on $N_c$ carbon dioxide compressors, and if the target load L<the actual load $L_r$, gradually turning off $N_c$ carbon dioxide compressors.

4. The multi-parallel carbon dioxide heat pump control method based on target load control according to claim 3, wherein, when the $N_c$ carbon dioxide compressors need to be gradually turned on, the time interval for turning on each carbon dioxide compressor is 20 s; each time one carbon dioxide compressor is turned on, and it starts from the one with the shortest cumulative running time among the non-operating carbon dioxide compressors;

when the $N_c$ carbon dioxide compressors need to be gradually turned off, the time interval for turning off each carbon dioxide compressor is 5 s; each time one carbon dioxide compressor is turned off, and it starts from the one with the longest cumulative running time among the operating carbon dioxide compressors.

5. The multi-parallel carbon dioxide heat pump control method based on target load control according to claim 3, comprising: after turning on or off the $N_c$ carbon dioxide compressors, recalculating the actual load $L_r$, and the absolute value of the load difference $L_{ab}=|L-L_r|$ between the actual load and the target load:
if $L_{ab}≥100\%/N$, recalculating the number $N_c$ of the carbon dioxide compressors that need to be turned on or off, and turning on or off the carbon dioxide compressors;
if $L_{ab}<100\%/N$ and L<$L_r$, adjusting the one with the longest running time among the variable-frequency carbon dioxide compressors in operation to reduce its working frequency, where its working frequency can be as low as $F_{min}$ until $L=L_r$;
if $L_{ab}<100\%/N$ and L≥$L_r$, adjusting the one with the shortest running time among the variable-frequency carbon dioxide compressors in operation to increase its working frequency, where its working frequency can be as high as $F_{max}$ until $L=L_r$.

6. The multi-parallel carbon dioxide heat pump control method based on target load control according to claim 1, wherein an inlet and an outlet of each of the carbon dioxide compressors are respectively provided with a temperature sensor.

7. The multi-parallel carbon dioxide heat pump control method based on target load control according to claim 1, wherein a pressure sensor is provided between the gas-liquid separator and the compressor unit.

8. The multi-parallel carbon dioxide heat pump control method based on target load control according to claim 1, wherein the oil-gas separator is provided with a gas-liquid inlet connected to the outlets of the carbon dioxide compressors, a gas outlet connected to the inlets of the carbon dioxide compressors, and a liquid outlet connected to the cooler condensing pipe.

9. The multi-parallel carbon dioxide heat pump control method based on target load control according to claim 8, wherein a temperature sensor and a pressure sensor are provided between the compressor unit and the gas-liquid inlet of the oil-gas separator.

10. The multi-parallel carbon dioxide heat pump control method based on target load control according to claim 1, wherein the oil-gas separator is provided with a gas-liquid inlet connected to the outlets of the carbon dioxide compressors, a gas outlet connected to the inlets of the carbon dioxide compressors, and a liquid outlet connected to the cooler condensing pipe;

the inlet and the outlet of each of the carbon dioxide compressors are respectively provided with a temperature sensor;

a pressure sensor is provided between the gas-liquid separator and the compressor unit;

the control method comprises following steps:

1) obtaining the inlet temperature $T_{hi}$ of the hot water pipeline, the outlet temperature $T_{ho}$ of the hot water pipeline and the flow V of the hot water pipeline, and according to the target outlet temperature $T_{obj}$ set by a user, calculating a target heating capacity $Q=1.163*(T_{obj}-T_{hi})*V$, and calculating a current heating capacity $Q_c=1.163*(T_{obj}-T_{ho})*V$;

2) when each carbon dioxide compressor is set to run at 50 Hz, the load of the carbon dioxide heat pump system is 100%, the number of the carbon dioxide compressors provided in the multi-parallel carbon dioxide heat pump is N, and according to the rated working conditions, the rated heating capacity of each carbon dioxide compressor is $Q_s$, thus a target load $L=Q/(N*Q_s)*100\%$, and an actual load $L_r=Q_c/(N*Q_s)*100\%$;

3) according to the target load L, the actual load $L_r$, the number n of variable-frequency carbon dioxide compressors, an upper limit $F_{max}$ and a lower limit $F_{min}$ of variable frequency of the variable-frequency carbon dioxide compressors, calculating a target opening degree of the electronic expansion valve $$K_e = f(L, L_r, F_{max}, F_{min}, n);$$

$$f(L, L_r, F_{max}, F_{min}, n) = A*\frac{|L_r - L|}{L} + B*\frac{(F_{min} - 50)}{F_{max} - F_{min}} + C*\frac{n*(F_{max} - F_{min})}{50N},$$

wherein, A, B and C are respectively specific coefficients, and A, B and C obtained by different equipments are different, and N is total number of the carbon dioxide compressors provided in the multi-parallel carbon dioxide heat pump;

4) adjusting the opening degree of the electronic expansion valve according to the target opening degree $K_e$ of the electronic expansion valve;

if the target load L≥the actual load $L_r$ and the target opening degree $K_e$ of the electronic expansion valve≥a current opening degree $K_c$, adjusting the opening degree of the electronic expansion valve to the target opening degree $K_e$;

if the target load L<the actual load $L_r$ and the target opening degree $K_e$ of the electronic expansion valve≥a current opening degree $K_c$, keeping the current opening degree $K_c$ of the electronic expansion valve unchanged;

if the target load L≥the actual load $L_r$ and the target opening degree $K_e$ of the electronic expansion valve<a current opening degree $K_c$, keeping the current opening degree $K_c$ of the electronic expansion valve unchanged;

if the target load L<the actual load $L_r$ and the target opening degree $K_e$ of the electronic expansion valve<a current opening degree $K_c$, adjusting the opening degree of the electronic expansion valve to the target opening degree $K_e$;

5) after adjusting the opening degree of the electronic expansion valve, according to the target load L and the actual load $L_r$, calculating the absolute value of the load difference $L_{ab}=|L-L_r|$, and calculating the number of the carbon dioxide compressors that need to be turned on or off $N_c=INT(L_{ab}/100\%/N)$; if the target load L≥the actual load $L_r$, gradually turning on $N_c$ carbon dioxide compressors, and if the target load L<the actual load $L_r$, gradually turning off $N_c$ carbon dioxide compressors;

in step 5), when the $N_c$ carbon dioxide compressors need to be gradually turned on, the time interval for turning on each carbon dioxide compressor is 20 s;

each time one carbon dioxide compressor is turned on, and it starts from the one with the shortest cumulative running time among the non-operating carbon dioxide compressors;

when the $N_c$ carbon dioxide compressors need to be gradually turned off, the time interval for turning off each carbon dioxide compressor is 5 s; each time one carbon dioxide compressor is turned off, and it starts from the one with the longest cumulative running time among the operating carbon dioxide compressors;

after turning on or off the $N_c$ carbon dioxide compressors, recalculating the actual load $L_r$, and the absolute value of the difference $L_{ab}=|L-L_r|$ between the actual load and the target load:

if $L_{ab}$≥100%/N, recalculating the number $N_c$ of the carbon dioxide compressors that need to be turned on or off, and turning on or off the carbon dioxide compressors;

if $L_{ab}$<100%/N and L<$L_r$, adjusting the one with the longest running time among the variable-frequency carbon dioxide compressors in operation to reduce its working frequency, where its operating frequency can be as low as $F_{min}$ until L=$L_r$;

if $L_{ab}$<100%/N and L≥$L_r$, adjusting the one with the shortest running time among the variable-frequency carbon dioxide compressors in operation to increase its working frequency, where its operating frequency can be as high as $F_{max}$ until L=$L_r$.

* * * * *